United States Patent
Leahy et al.

[11] Patent Number: 5,868,177
[45] Date of Patent: Feb. 9, 1999

[54] METHOD AND APPARATUS FOR INJECTING ADDITIVES

[75] Inventors: Ricky E. Leahy, Loveland; John J. Fitzsimmons, Parker, both of Colo.

[73] Assignee: Chemical Control Systems, Inc., Parker, Colo.

[21] Appl. No.: 508,065

[22] Filed: Jul. 27, 1995

[51] Int. Cl.⁶ .............................. B65B 1/04; B65B 3/04; B67C 3/02
[52] U.S. Cl. .............................. 141/104; 141/9; 141/18; 141/69; 141/105; 141/192; 222/144.5
[58] Field of Search ..................... 141/9, 69, 83, 141/94, 104, 105, 192, 196, 18, 389, 388, 387, 98; 222/71, 144.5, 135; 137/551, 896, 897, 898, 602, 606, 615

[56] References Cited

U.S. PATENT DOCUMENTS

| | | | |
|---|---|---|---|
| 4,498,496 | 2/1985 | Barcellona et al. | 137/606 |
| 4,691,850 | 9/1987 | Kirschmann et al. | 222/144.5 |
| 4,989,632 | 2/1991 | Bauerle | 137/606 |
| 4,989,637 | 2/1991 | Dittrich | 137/606 |
| 5,199,604 | 4/1993 | Palmer et al. | 222/144.5 |
| 5,234,268 | 8/1993 | Homan | 222/135 |

FOREIGN PATENT DOCUMENTS

| | | |
|---|---|---|
| 147210 | 11/1982 | Norway . |
| 1 386 998 | 3/1975 | United Kingdom . |
| 1 404 498 | 8/1975 | United Kingdom . |
| 1 438 164 | 6/1976 | United Kingdom . |
| 1 474 019 | 5/1977 | United Kingdom . |
| 1 513 520 | 6/1978 | United Kingdom . |

*Primary Examiner*—Henry J. Recla
*Assistant Examiner*—Timothy L. Maust
*Attorney, Agent, or Firm*—Shook, Hardy & Bacon L.L.P.

[57] ABSTRACT

An interchangeable additive injection apparatus provides a plurality of flow paths from one or more upstream additive tanks to one or more downstream fuel containers. A plurality of additive lines converge into an additive conduit at a manifold disposed within the apparatus. A plurality of valves associated with the additive lines are selectively opened and closed to isolate one of the flow paths. A metering device is disposed along the additive conduit for measuring the flow of additive therethrough. A reversible, multiple port housing surrounds at least the valves and manifold. In a forward orientation, a plurality of upstream ports are coupled to upstream additive tanks, and a downstream port is coupled to a fuel tank. By reversing the housing, the apparatus is placed in a reverse orientation wherein the upstream port is connected to an upstream additive tank and a plurality of downstream ports are connected to downstream fuel tanks. In either orientation, an expansion apparatus may be coupled to an expansion port on the additive injection apparatus to provide a number of additional ports and flow paths. A controller is coupled with the injection apparatus to monitor and control the associated pumps, valves and meters.

21 Claims, 3 Drawing Sheets

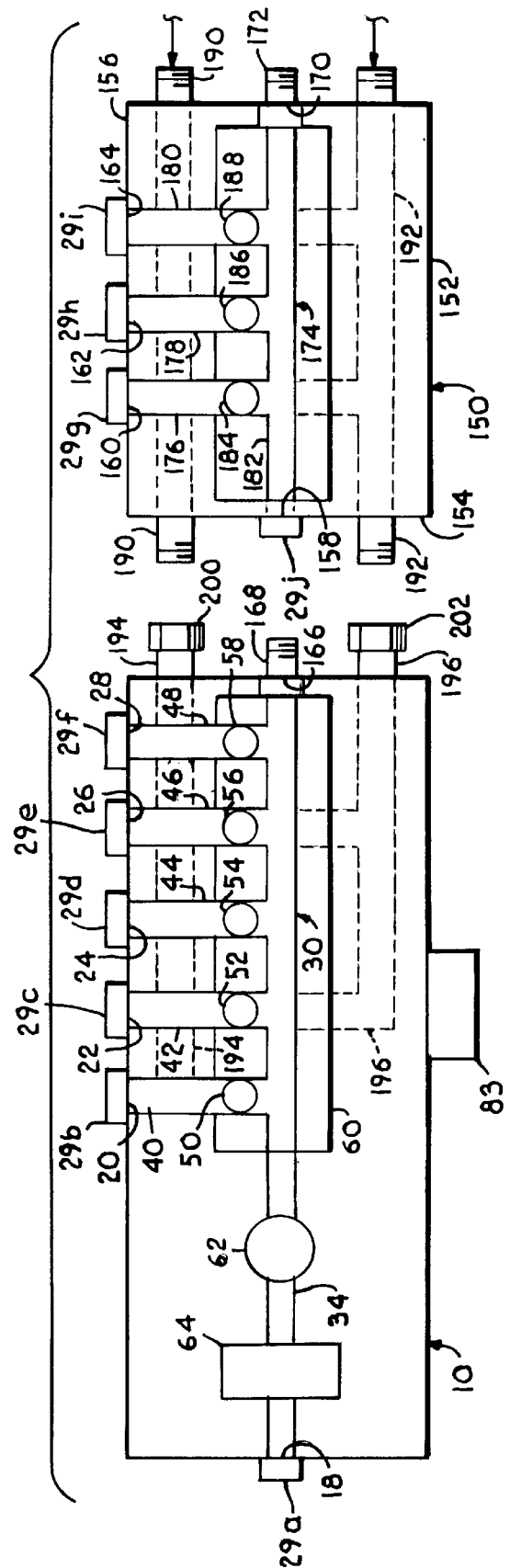

METHOD AND APPARATUS FOR INJECTING ADDITIVES

BACKGROUND OF THE INVENTION

This invention relates in general to a method and apparatus for injecting additive into fuel products and, more particularly, to a system and method for controlling the flow of additive through an interchangeable additive injection apparatus providing a plurality of flow paths from one or more upstream additive tanks to one or more downstream fuel containers.

A well-known application for additive injection systems is a truck loading terminal wherein tanker trucks are filled with fuel for transporting the fuel to a further distribution site. A tank on the truck is filled primarily with a generic fuel product from a fuel supply pipe. As the fuel is loaded into the tank, one or more fluid additives may be injected into the fuel stream to form a blended mixture of additive and the generic fuel product. The additive is typically injected into a fuel load arm connecting the fuel supply pipe to the fuel tank. The recipient of the shipment of fuel loaded into the tanker truck will often preselect the particular additive and specify the quantity (or ratio) of additive desired for the blended fuel. Consequently, the generic fuel may become the proprietary product of a fuel marketing company by blending a particular additive with the generic fuel in a specified ratio.

Additive injection equipment is used to blend the additive with the generic fuel. It is important to provide an accurate dosage of additive for each individual batch. This requires careful measurement of the additive as well as timely control of additive flow. Otherwise, the equipment may continue to inject additive into the load arm after the fuel stream has terminated. If so, not only will the most recent batch of fuel have a lower ratio of additive to fuel, but a subsequent batch of fuel may unintentionally flush the additive remaining in the load arm into the fuel tank on the truck. The presence of this extra additive in the subsequent batch of fuel will adversely affect the desired additive to fuel ratio for that batch, which may call for a different additive altogether.

Typically, the prescribed additive is incrementally blended into the fuel stream at discrete intervals defined by a preselected ratio of fuel to additive. For example, a particular order may require the injection of one gallon of additive into the load arm after 40 gallons of fuel have been supplied to the load arm. A fuel meter on the fuel supply pipe measures the fuel supplied to the load arm and sends pulses representing the quantity of fuel supplied to the additive injection equipment. Upon receiving a predetermined number of such pulses, the additive injection equipment supplies one gallon of additive to the load arm. Thus, the prescribed dose of additive is cyclically injected into the fuel stream based on the preselected ratio.

In an existing additive injection system, each chemical additive tank includes a control panel having a microprocessor, a solenoid valve and a flow meter. One additional control panel is required for each additional fuel load arm to which the additive tank is coupled for injecting additive therein. These control panels control the flow of additive into the load arm in response to pulses received from the fuel flow meter, the pulses representing the quantity of fuel passing through the supply pipe as described above.

Alternatively, the additive may be continuously fed into the fuel stream in accordance with a predetermined additive to fuel ratio. For continuous injection, the injection of additive commences shortly after fuel begins to flow through the supply pipe into the load arm. Throughout most of the fuel loading process, the proportion of additive to fuel supplied to the fuel tank substantially adheres to the established ratio. However, the rate of additive injection should drop off sharply just prior to the termination of fuel flow through the fuel supply pipe. Otherwise, the previously addressed problem of additive remaining in the fuel load arm may occur.

Another problem associated with conventional additive injection systems is that the control panels, each with its own microprocessor, solenoid valve and flow meter, are an expensive investment. A relatively large number of these expensive control panels is required to enable the additive to flow from any one of a plurality of additive tanks to one or more fuel load arms. As an example, a fuel truck loading terminal with five additive tanks and two fuel load arms would require ten separate control panels, each additive tank requiring a separate control panel for each load arm serviced. Accordingly, the five additive tanks would require a total of ten microprocessors, ten solenoid valves and ten flow meters. Furthermore, when one of the valves or meters fails, the injection system must be shut down until the device can be repaired or replaced. Thus, in addition to the expense of replacement parts, a faulty control panel may cause significant downtime and require considerable operator time before the system can be repaired and is operating again.

Additive injection equipment may also be used to inject certain additives into fuel tanks in a retail setting, such as a service station. A service station may inject varying levels of additive from a single on site additive tank into several fuel tanks to create different grades of gasoline. Typically, each fuel tank at a service station will be associated with its own fuel supply pipe. The additive tank may be individually coupled with each of the fuel supply pipes so that a desired quantity of additive can be blended with the fuel supplied to any one of the fuel tanks. Each of the fuel tanks at the service station is also associated with a separate fuel pump accessible to consumers. Thus, a consumer may individually select a particular grade of gasoline based on the relative quantity of additive contained in the fuel.

By contrast to the wholesale systems employed at truck loading terminals, retail systems typically do not inject additive at intervals in response to the flow rate of fuel into the fuel tank because the flow rates are generally too high for the control panels to measure the pulses. Rather, most retail systems employ a batch process for injecting a preselected quantity of additive into the fuel supply pipe based on the quantity of fuel to be loaded into the fuel tank. For retail applications, fuel and additive are usually manually injected into the fuel tank, but it is not uncommon for an operator to use a computer or microprocessor to indicate the desired quantity of additive or fuel to be loaded just prior to manual injection. In any event, current retail injection systems are generally time and labor intensive and do not provide the accuracy and efficiency of automated injection systems.

An additional problem associated with the additive injection systems of the prior art arises when additive tanks or pipes are exposed to freezing temperatures. In this event, the additive contained therein may become stratified, undermining the injection process. One solution to this problem is to add diluents to the additive, which often increases the expense of the additive. However, it is preferable to avoid the use of diluents and blend concentrated additive with the fuel.

SUMMARY OF THE INVENTION

The present invention is directed to a system and method for controlling the injection of additive along a plurality of additive flow paths leading from at least one upstream additive tank to one or more downstream fuel containers. The invention overcomes the problems and limitations set forth above by providing a reversible additive injection apparatus having a common meter and a common control valve associated with multiple additive lines. Consequently, the multiple port injection apparatus substantially reduces the equipment cost and the space requirements associated with conventional additive injection equipment. The injection apparatus is embodied in a self-contained housing unit that may be removably coupled with upstream additive tanks and downstream fuel tanks. Thus, the entire injection apparatus may be conveniently removed for maintenance purposes and quickly replaced with another injection apparatus, substantially reducing downtime. In one embodiment, the injection apparatus may be adapted for coupling with an expansion apparatus to selectively increase the number of available ports and flow paths.

In wholesale applications, the injection apparatus is coupled with a plurality of upstream additive tanks in a forward orientation to permit additive flow therethrough for injection into a single downstream fuel load arm. Moreover, the injection apparatus may be utilized in retail applications by reversing the orientation of the apparatus so that the flow of additive from a single upstream additive tank may be directed to flow into any one of a plurality of downstream fuel tanks. In either orientation, a single programmable logic controller (PLC) communicates with the various pumps, valves and meters to monitor and control the flow of additive through the additive injection apparatus of the present invention. In addition, while each additive flow path has an associated solenoid valve, the apparatus of the present invention utilizes a single common flow meter and a single common control valve. Further, a circulation loop may be coupled to any of the additive tanks to prevent stratification of the liquid additive (e.g., as a result of freezing temperatures) so that diluents need not be added to the additive. The additive is preferably front end loaded to ensure that the fuel stream will flush the additive into the fuel container.

Accordingly, it is an object of the present invention to provide a dual orientation additive injection apparatus for providing a plurality of additive flow paths from one or more upstream additive tanks to one or more downstream fuel containers.

It is another object of the present invention to provide an injection apparatus and method whereby the flow of additive through a plurality of additive flow paths is controlled by a single apparatus having a common microprocessor, a common control valve and a common flow meter, so that the single apparatus and common microprocessor can function in place of a plurality of control panels, greatly reducing the investment cost associated with additive injection systems.

It is still another object of the present invention to provide a reversible, interchangeable injection apparatus embodied in a self-contained housing unit adapted to be selectively, removably coupled with an additive conduit and multiple additive lines for increased cost and time efficiency in maintenance and replacement of the injection apparatus.

It is yet another object of the present invention to provide a controller for monitoring the additive injection apparatus and controlling the flow of additive therethrough.

It is a further object of the present invention to provide a system and method for controlling additive flow from a plurality of additive tanks through a single additive injection apparatus so that at least one of a plurality of additives may be selectively injected into a fuel load arm.

Another object of the present invention is to provide a system and method for controlling additive flow through an additive injection apparatus so that the additive may be selectively injected into a plurality of fuel tanks, whereby each of the fuel tanks contains fuel having a different ratio of additive to gasoline.

Yet another object of the present invention is to provide an additive injection apparatus that is more compact and cost effective than conventional additive injection equipment.

A further object of the present invention is to provide a circulation loop for an additive tank whereby said loop is monitored by a controller to circulate the additive therethrough so that the integrity of the liquid additive is maintained.

Yet a further object of the present invention is to provide an additive injection apparatus adapted to be coupled with an expansion apparatus so that the number of additive flow paths may be conveniently increased.

These and other related objects of the present invention will become readily apparent upon further review of the specification and drawings. To accomplish the objects of the present invention, a reversible, interchangeable additive injection apparatus is provided comprising a manifold, a plurality of additive lines converging into an additive conduit at the manifold, a plurality of valves associated with said additive lines, a common metering device for measuring the flow of additive and a multiple port, selectively removable housing unit surrounding at least the plurality of valves and the manifold.

In another aspect of the present invention, a controller is provided to monitor and control the flow of additive through an additive injection apparatus by selectively opening and closing the plurality of valves associated with the additive lines, as well as the common control valve, and by monitoring the flow of additive through the common meter. The controller may also monitor the operation of any other pump, meter, valve or other device associated with the additive injection system. The controller may be programmed to sound an alarm when any component of the system becomes disconnected or requires maintenance.

BRIEF DESCRIPTION OF THE DRAWINGS

In the accompanying drawings which form a part of the specification and are to be read in conjunction therewith and in which like reference numerals are used to indicate like parts in the various views:

FIG. 5 is an exploded schematic illustration of an additive injection apparatus adapted for coupling with an expansion apparatus in accordance with a preferred embodiment of the present invention.

DETAILED DESCRIPTION OF THE DRAWINGS

Figure 3:
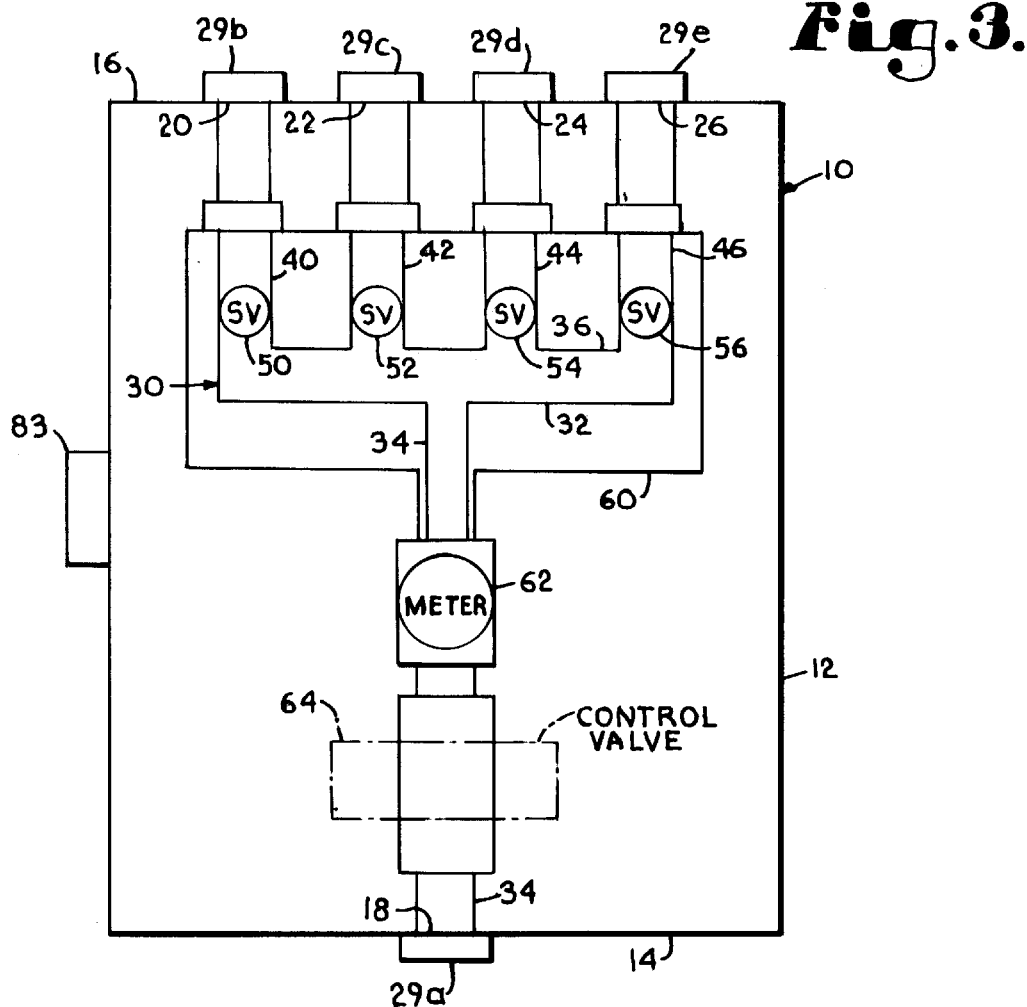
FIG. 3 is a schematic illustration of an additive injection apparatus for the systems of FIGS. 1 and 2.

Referring to the drawings in greater detail, and initially to FIG. 3, the additive injection apparatus of the present invention is designated generally by reference number 10. Apparatus 10 comprises a housing unit 12 having a front outer surface 14 and a rear outer surface 16. Front surface 14 presents a front port 18, and rear surface 16 presents a plurality of rear ports 20–26. Each port 18–26 is adapted to receive a coupler 29 so that front port 18 is associated with a coupler 29a and rear ports 20–26 are associated with couplers 29b–29e, respectively.

Apparatus 10 further comprises a manifold 30 within housing 12, the manifold having a first interface 32 coupled with an additive conduit 34 and a second interface 36 coupled with a plurality of additive lines 40–46. As shown in FIG. 3, conduit 34 extends from manifold 30 to port 18, and the additive lines 40–46 each extend from manifold 30 to rear ports 20–26, respectively, the lines and conduit being in fluid communication with the manifold 30. Accordingly, in the embodiment depicted, apparatus 10 presents four different flow paths between front surface 14 and rear surface 16.

A plurality of solenoid valves 50–56 are associated with the additive lines 40–46, respectively. Each of the valves 50–56 is disposed within one of the additive lines 40–46 in close proximity to second interface 36. If desired, manifold 30, conduit 34, lines 40–46 and valves 50–56 may be housed together in a manifold assembly 60. In this embodiment, conduit 34 extends from assembly 60 to port 18, and lines 40–46 extend from assembly 60 to ports 20–26, respectively.

An additive meter 62 and a control valve 64 are preferably coupled to conduit 34 intermediate manifold 30 (or assembly 60) and front surface 14. Valve 64 may be omitted if the additive will be front end loaded as discussed more fully below. In an alternative embodiment, meter 62 and/or valve 64 may be located outside of housing 12 but would still be disposed along conduit 34.

Figure 4:
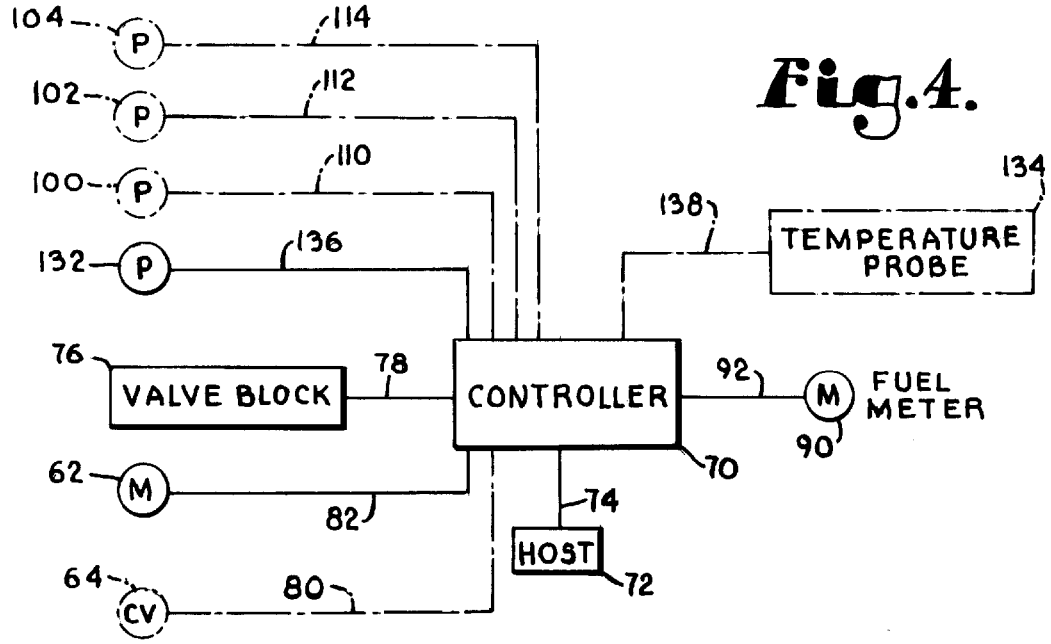
FIG. 4 is a schematic representation of the controller circuitry for the systems of FIGS. 1 and 2.

Referring now to FIG. 4, the preferred embodiment of the present invention also includes a controller 70 for controlling the flow of additive through the injection apparatus 10. Controller 70 may be any one of a number of commercially available programmable logic controllers or similarly equipped computers capable of performing the supervisory functions described below. Preferably, controller 70 interacts with a host computer 72 over a communications link 74 so that computer 72 stores and displays the information received and generated by controller 70.

Controller 70 is adapted to send control signals to each of the solenoid valves 50–56. Additionally, controller 70 is adapted to monitor the status and operability of each of the solenoid valves 50–56. These valves are shown collectively in FIG. 4 as a valve block 76 containing multiple valves in a single valve body (also shown in FIGS. 1 and 2). A link 78 represents the connection between controller 70 and valve block 76 for transmitting signals back and forth. Likewise, controller 70 and valve 64 may transmit signals back and forth over a link 80. Meter 62 transmits signals indicative of the quantity of the additive flow to controller 70 over a link 82. An electrical box 83 (FIG. 3) may be provided along housing 12 of apparatus 10 to receive the electrical wiring from controller 70. Moreover, controller 70 may communicate with liquid level sensors in each of the Additive Tanks A–E (FIG. 1) to monitor the inventory of fuel in each tank and to monitor any changes in the respective tank levels. Those skilled in the art will readily appreciate that links 78–82, as shown in FIG. 4, are merely exemplary of the communications links between the controller 70 and apparatus 10 and many alternative arrangements for accomplishing the same general functionality would not depart from the preferred embodiment of the present invention.

Figure 1:
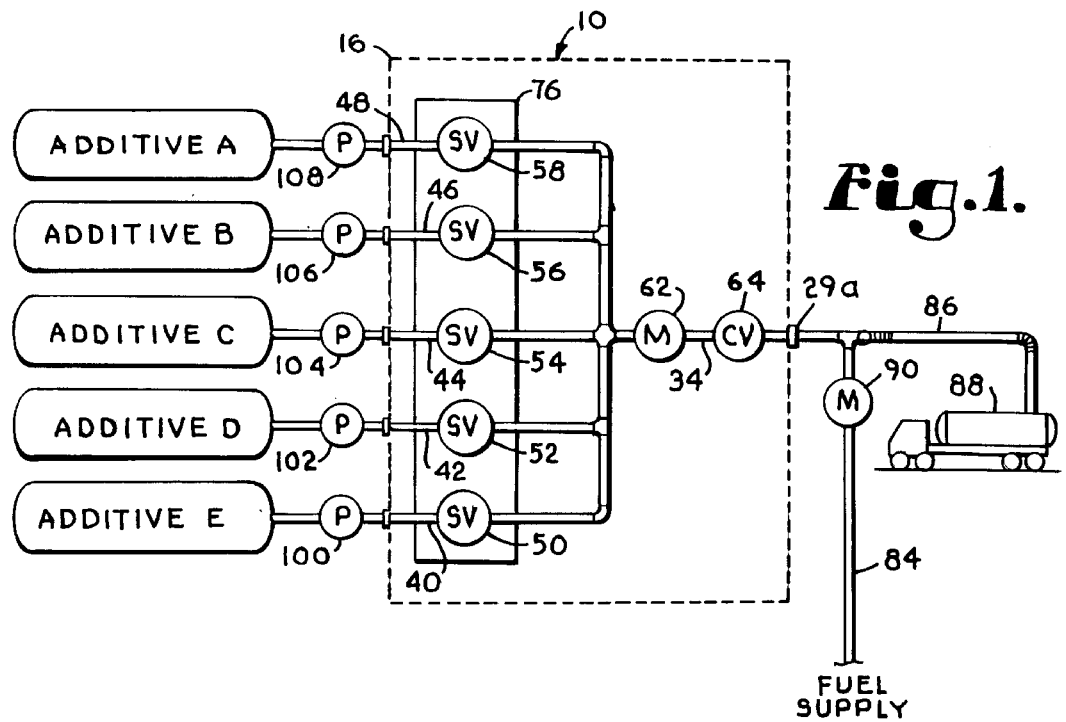
FIG. 1 is a schematic illustration of an additive injection system for a fuel truck loading terminal in accordance with a preferred embodiment of the present invention wherein the additive injection apparatus is disposed in a forward orientation.
Figure 2:
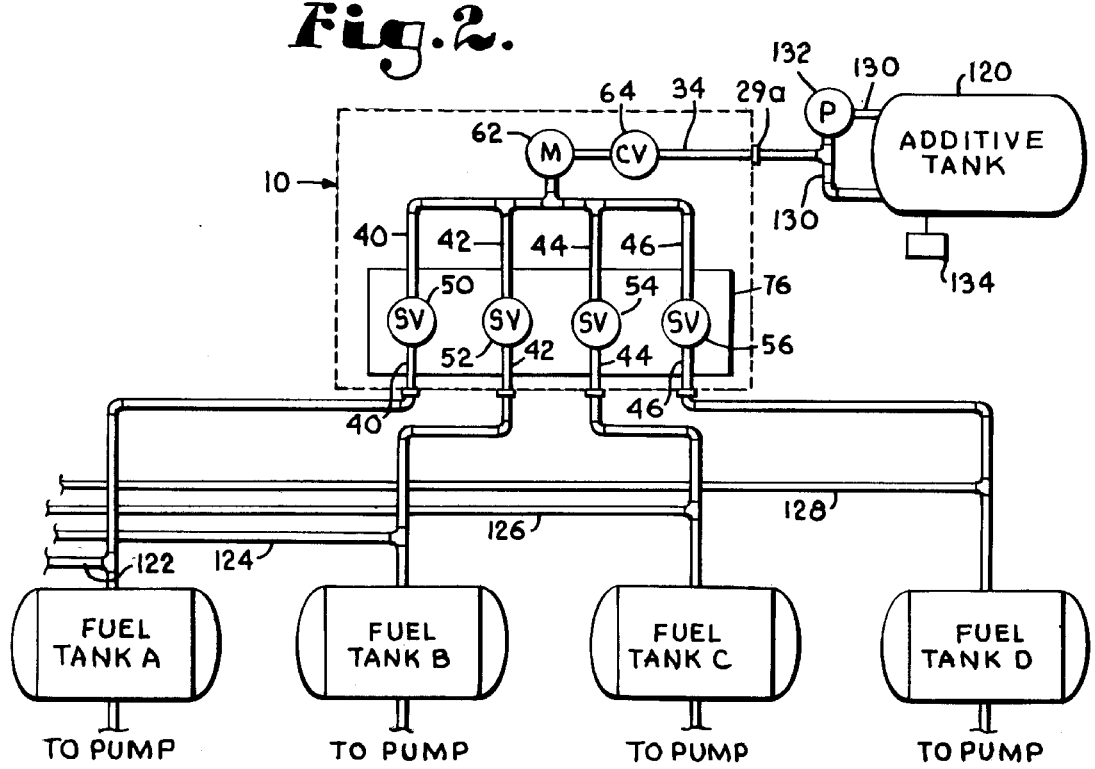
FIG. 2 is a schematic illustration of an additive injection system for a service station in accordance with a preferred embodiment of the present invention wherein the additive injection apparatus is disposed in a reverse orientation.

With specific reference to FIGS. 1 and 2, apparatus 10 may be disposed in either a forward orientation such as at a truck loading terminal (FIG. 1) or in a reverse orientation such as at a service station (FIG. 2). The truck loading operation as shown in FIG. 1 includes five separate additive tanks, each containing a different fuel additive and each connected to apparatus 10 via the ports located on rear surface 16. Couplers 29 can be one-half inch stainless steel fittings provided at each port for coupling apparatus 10 with conduits leading to the additive and fuel tanks, although any conventional coupling means consistent with this invention may be employed. The couplers 29 connect apparatus 10 with selected additive and fuel tanks so that each port of apparatus 10 is in fluid communication with either an additive tank or a fuel tank. The couplers 29 are adapted to be quickly and easily connected and disconnected to fuel and additive lines so that each port of apparatus 10 may be selectively coupled with an additive or fuel tank via a conduit leading to the tank.

In this example, valve block 76 contains five solenoid valves 50–58 coupled with additive lines 40–48, respectively. At manifold 30, the additive lines converge into additive conduit 34. Meter 62 and control valve 64 are coupled with conduit 34. Conduit 34 merges with a fuel supply pipe 84 into a fuel load arm 86 which empties into a fuel tank 88 on a tanker truck. A fuel meter 90 associated with pipe 84 measures the quantity of fuel supplied to arm 86.

Controller 70 is preferably connected to fuel meter 90 over a link 92 (FIG. 4) for receiving data signals therefrom indicative of the quantity of fuel supplied through pipe 84 to load arm 86. Alternatively, controller 70 may receive fuel data signals from a fuel controller (not shown) that supervises the flow of fuel through pipe 84 and generates the fuel data signals based on communications with meter 90.

If desired, controller 70 may be adapted to communicate control signals to a pump 100 associated with Additive Tank E and further adapted to receive status signals indicating whether pump 100 is "on" or "off." Some or all of the remaining pumps 102–108 shown in FIG. 1 may also be coupled with controller 70. As an example, pumps 100–104 are connected to controller 70 over links 110–114, respectively (FIG. 4).

In FIG. 2, the orientation of apparatus 10 is reversed in that conduit 34 is coupled to an upstream additive tank 120, and additive lines 40–46 are coupled to downstream fuel tanks A–D. Fuel tanks A–D contain various grades of gasoline accessible to consumers at a service station through corresponding fuel pumps. A plurality of fuel supply pipes 122–128 are in fluid communication with fuel tanks A–D, respectively, to provide fuel thereto. In most other respects, apparatus 10 as oriented in FIG. 2 performs in the same manner as when oriented as shown in FIG. 1, with meter 62 and control valve 64 coupled with conduit 34, and solenoid valves 50–56 are coupled with associated additive lines 40–46, respectively.

As shown in FIG. 2, conduit 34 is also coupled with additive tank 120 through a circulation conduit 130. A pump 132 and a temperature probe 134 are also associated with additive tank 120 and conduit 130. Pump 132 and temperature probe 134 may communicate with controller 70 over links 136 and 138, respectively (FIG. 4). Probe 134 can monitor the temperature of the additive in tank 120 (as shown in FIG. 2) and/or the temperature of any additive in conduit 130.

Turning now to FIG. 5, the injection apparatus 10 may be conveniently expanded to include a number of additional ports by coupling apparatus 10 with an expansion apparatus 150. The ability to increase the number of ports via expansion apparatus 150 advantageously provides the additive injection system with greater capacity and flexibility without the need to replace apparatus 10. Apparatus 150 includes a housing unit 152 including a front outer surface 154 and a rear outer surface 156. A front port 158 is disposed along front surface 154, and rear ports 160–164 are located along rear surface 156. For both injection apparatus 10 and expansion apparatus 150, the front and rear surfaces are not necessarily opposite one another.

As depicted in FIG. 5, apparatus 10 may be expanded to provide three additional rear ports 160–164. Each rear port 20–28 and 160–164 is adapted to present a corresponding coupler 29b–29f and 29g–29i, respectively. Likewise, front port 158 is adapted to present a front coupler 29j for coupling apparatus 10 to apparatus 150. To accommodate expansion, apparatus 10 presents an expansion port 166 adapted to provide an expansion connector 168 for coupling port 166 with port 158. Of course, apparatus 10 and expansion apparatus 150 may include any desired number of ports. Likewise, an additional expansion apparatus may be connected to expansion apparatus 150 by coupling the front port of the additional expansion apparatus to an expansion port 170 presented by apparatus 150 via an expansion connector 172.

As with housing unit 12, a manifold 174 is positioned within housing 152. A plurality of additive lines 176–180 converge into an additive conduit 182 at expansion manifold 174. Additive lines 176–180 extend from manifold 174 to rear ports 160–164 respectively. Each valve 184–188 is disposed in a corresponding additive line 176–180, respectively, preferably at a point adjacent the convergence of the additive line into manifold 174.

Expansion apparatus 150 further includes conduits 190 and 192, through which electrical wiring may be connected with the solenoid valves 184–188. Likewise, apparatus 10 provides conduits 194 and 196 for providing electrical connections to valves 50–58. Apparatus 10 may provide conduits 194 and 196 in lieu of or in addition to electrical box 83. Expansion conduits 190 and 192 may be coupled with conduits 194 and 196, respectively, by any known means, such as by male connectors 200 and 202. When apparatus 150 is coupled with apparatus 10, the electrical wiring for valves 50–58 and/or other components of apparatus 10 may be received into conduits 194 and 196 through conduits 190 and 192.

In operation, controller 70 controls the flow of additive along a selected flow path from an upstream additive tank to a downstream fuel tank. Referring to the truck loading terminal shown in FIG. 1, an operator may select one flow path from the other flow paths by selecting a particular additive (e.g., Additive E) at the user interface of computer 72. The operator may also select a specific quantity of fuel (e.g., gallons or gallons per minute) to be supplied to the tank 88 for blending with the selected additive. Further, the operator may select a specific quantity of the selected additive, or the quantity of additive to be injected may be determined by a preselected ratio of fuel to additive. In any event, computer 72 will store a quantity of fuel and a quantity of selected additive in memory as reference values for terminating the load process. It will be appreciated by those skilled in the art that many of the functions performed by computer 72 might alternatively be performed by the controller 70 and vice versa. In fact, controller 70 and host 72 may be embodied in a single device.

If Additive E is selected for injection into the fuel supply, controller 70 will send a preliminary control signal to apparatus 10 for opening solenoid valve 50 and closing solenoid valves 52–58. However, the preliminary control signals may not be necessary if controller 70 is monitoring the status of solenoid valves 50–58 and if each of the valves is already in the appropriate open or closed position. Preferably, valve 64 may be partially opened or fully opened to control the flow rate of the additive. Thus, controller 70 will ensure that control valve 64 is in an appropriate open position. At this point, additive may flow from Additive Tank E to fuel tank 88 through apparatus 10. Of course, valves 52–58 are closed to prevent additive from Additive Tanks A–D from flowing downstream of valve block 76. Pump 100 may be activated by a control signal from controller 70 to facilitate the flow of Additive E through injection apparatus 10 to load arm 86.

As mentioned above, controller 70 monitors the operation of apparatus 10. An alarm will sound if controller 70 detects a failure (e.g., mechanical or electrical failure) in any of the monitored features. Typically, the injection operation will be suspended until the operator evaluates the alarm condition. For example, the operator may resolve the problem by making a simple software modification, or it may be necessary to replace a portion of or the entire injection apparatus 10. Essentially, the operator initiates and monitors the additive injection process via the user interface of computer 72. Thus, the operator may interrupt or restore the injection process, if necessary. In any event, the injection apparatus of the present invention is designed to effect a timely return to injection operations.

Several alternative modes for blending additive with fuel are well known in the art and can be adapted for use in conjunction with the method and apparatus of the present invention. First, additive may be continuously injected into a fuel stream for substantially the entire duration of the loading operation. As discussed in more depth above, the additive is typically not injected into the fuel stream until shortly after fuel begins to flow past the injection point in the load arm, and additive injection should end shortly before termination of the fuel stream.

A second approach involves periodically injecting a preselected quantity of additive in intervals corresponding to the flow rate of fuel in accordance with a preselected ratio of fuel to additive. For example, fuel meter 90 may deliver a pulse to controller 70 each time it measures one gallon of fuel passing through supply pipe 84. If the preselected ratio is 40:1, then controller 70 will instruct apparatus 10 to inject one gallon of the selected additive into the fuel stream each time 40 pulses are received from fuel meter 90.

Although apparatus 10 may also be used in conjunction with the above modes for additive injection, the presently preferred mode of injection for the present invention is to front end load the selected additive into load arm 86. It may be desirable to inject the entire predetermined quantity (or reference quantity) of selected additive into load arm 86 before the supply of fuel commences. At other times, it may not be desirable to commence additive injection before the fuel stream is present. For example, it may be desirable to inject the entire predetermined quantity of selected additive within the first one-third or one-half of the predetermined quantity of fuel, but additive can be "front end loaded" in many different sequences depending on the circumstances. In any event, front end loading typically involves injecting substantially all of the selected additive well in advance of the termination of the fuel stream. This practice should result in a relatively clean load arm 86 because the "back end" of the fuel stream should flush any remaining additive out of load arm 86 and into tank 88.

Controller 70 may terminate additive injection of Additive E by sending a termination control signal to apparatus 10 for closing solenoid 50 and/or control valve 64. Depending on the mode of operation, controller 70 may terminate additive injection in response to receiving additive data signals from meter 62 indicating that the predetermined quantity of additive has passed through apparatus 10. Alternatively, controller 70 may terminate additive injection in response to receiving fuel data signals from fuel meter 90 indicating that a predetermined quantity of fuel has passed through pipe 84. Of course, controller 70 may also terminate additive injection in response to a combination of additive data signals and fuel data signals.

Furthermore, controller 70 and computer 72 may be programmed to perform a number of operations involving the additive injection process. For example, daily reports may be generated containing information relating to additive inventory or equipment maintenance. Computer 72 may provide a graphical representation of each load operation. Controller 70 and computer 72 may be programmed to monitor the components of the injection system and report undesirable conditions by producing an audio and/or visual alarm. Those skilled in the art will recognize other operations that may be carried out by controller 70 and computer 72 in conjunction with an additive injection system.

Although the example discussed above involves blending a single additive with a generic fuel, the present invention contemplates injecting multiple additives into fuel from a single injection point. For example, with reference to FIG. 1, a fuel order may call for 10 gallons of Additive A, 20 gallons of Additive B, 30 gallons of Additive C and 100 gallons of generic fuel. The specified additives may either be front end loaded or injected in response to pulses from the fuel supply meter. In either case, controller 70 manipulates the valves of apparatus 10 to provide the specified quantity of each additive. Controller 70 may also control the pumps 100–108 associated with each of the additive tanks.

As in the wholesale setting, front end loading is the preferred mode of operation for most retail applications (FIG. 2). In these retail settings, it is common to inject the entire batch of additive into the selected fuel tank before the corresponding supply of fuel is delivered to the tank. As stated above, this practice ensures that the pipes leading into the fuel tanks will remain substantially free of additive residue.

Service stations often maintain a plurality of fuel tanks each containing different grades of gasoline. The difference between the grades of gasoline may simply be slightly different ratios of fuel to additive for the same additive. For example, if 400 gallons of gas were to be added to each fuel tank A–D, then it may be desirable to inject one gallon of additive into Tank A, three gallons of additive into Tank B, five gallons of additive into Tank C and seven gallons of additive into Tank D. Alternatively, the difference between the grades of gasoline may be that each grade of gasoline contains a different additive or a different combination of additives.

As noted above, apparatus 10 is depicted as being disposed in a reverse orientation in FIG. 2 when compared to FIG. 1. That is, in FIG. 2, conduit 34 is coupled with upstream additive tank 120 rather than downstream fuel tank 88. Furthermore, circulation loop 130 allows additive in tank 120 to be circulated therethrough to prevent the additive from stratifying. For example, if the additive will be exposed to freezing temperatures during the winter months, controller 70 may be programmed to activate pump 132 upon receiving a low additive temperature reading from temperature probe 134. Thus, the desired viscosity of the additive in tank 120 and in the conduit leading to tank 120 may be maintained by either periodic or continuous circulation through conduit 130. Any of the additive tanks A–E in FIG. 1 may also be coupled with a circulation conduit in a manner similar to that shown in FIG. 2.

Regardless of whether additive tank 120 is coupled with conduit 130, the injection of additive is otherwise essentially the same as described above for FIG. 1. An operator may input a predetermined quantity of additive to be injected into one or more of the fuel tanks A–D. This will typically be accompanied by a predetermined quantity of fuel subsequently supplied to the same tank or tanks. Thus, the fuel flushes any remaining additive into the fuel tank, and the fuel and additive are mixed together in the fuel tank.

For example, an operator may select one gallon of additive for injection into Fuel Tank A since 100 gallons of fuel will subsequently be provided to Tank A. Thus, controller 70 will send preliminary control signals to apparatus 10 to open solenoid valve 50 and control valve 64 and to close solenoid valves 52–56. If controller 70 is connected to pump 132, the controller will activate the pump to facilitate the flow of additive from tank 120 to Tank A.

Once additive flow commences, controller 70 will receive additive data signals from meter 62 indicating the quantity of additive flowing through apparatus 10 along the selected flow path. Although there may be a fuel meter associated with fuel supply pipe 130, no such meter is shown in FIG. 2 since additive injection in this setting will preferably terminate prior to the commencement of the fuel supply. Therefore, in this embodiment, the controller will simply compare the additive data signals to the predetermined quantity of additive and send a termination control signal to the injection apparatus 10 for closing valve 50 and/or valve 64 when the predetermined quantity of additive has been injected into Tank A.

Some retail establishments monitor the fuel level within each fuel tank instead of placing a meter on the additive conduit. Thus, if the additive and fuel are added separately, the quantity of additive may be determined by comparing the tank level after injection with the tank level prior to injection. In accordance with the present invention, controller 70 would simply be connected with the tank level monitors instead of (or in addition to) receiving additive data signals from meter 62.

The additive injection apparatus 10 is a relatively inexpensive and compact piece of equipment that is easily removable at all points of connection for maintenance or for replacement, and obviates the need for multiple, expensive control panels. Removing the apparatus of FIG. 3 from an additive injection system would merely require disengaging the couplers 29 located at each port 18–26 along housing 12. Moreover, apparatus 10 may be conveniently employed in new and existing additive injection systems for in either a forward or reverse orientation. Furthermore, the present invention contemplates that apparatus 10 may be modified for specific applications. For example, the apparatus may be adapted to include any number of ports, such as providing an additional front port to accommodate a connection to an additional load arm, fuel tank or additive tank.

Furthermore, the present invention advantageously provides for expandability and redundancy in a compact apparatus. As an example, an injection apparatus having five rear ports is particularly appropriate for an operation that will currently utilize three of the ports but may utilize additional ports in the future. These two extra ports can serve as backup ports in case one or two of the other ports experience a functional problem (e.g., a solenoid valve that needs to be replaced). By simply reconnecting the conduit to one of the backup ports and making a minor software modification, the operation may continue without significant downtime. Then, the injection apparatus may be repaired or replaced at a more convenient time. Similarly, the apparatus may be conveniently coupled with an expansion apparatus to provide additional rear ports to accommodate expansion and/or to provide one or more backup ports.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. An injection apparatus providing a plurality of additive flow paths between at least one upstream additive tank and at least one downstream fuel vessel, said apparatus comprising:
    a housing presenting a plurality of front ports and at least two rear ports;
    a manifold disposed within the housing, the manifold having a first interface and a second interface;
    an additive conduit coupled with the first interface so that a first end of the additive conduit terminates at the manifold and a second end of the additive conduit is in fluid communication with one of the front ports;
    a plurality of additive lines disposed within the housing and coupled with the second interface so that a first end of each additive line terminates at the manifold and a second end of each additive line is in fluid communication with a corresponding rear port;
    a plurality of valves, each disposed within one of the additive lines, wherein each of the valves is operable between an open position permitting additive flow therethrough and a closed position preventing additive flow therethrough; and
    a metering device coupled with the additive conduit for measuring the flow of additive therethrough.

2. The apparatus of claim 1, wherein each port is adapted to be removably coupled with a conduit leading to an upstream additive tank or a downstream fuel tank so that the housing may be selectively removed from a first additive injection system and disposed in a second additive injection system.

3. The apparatus of claim 1, further comprising a control valve coupled with the additive conduit, the control valve being operable between a closed position preventing additive flow therethrough and at least one open position permitting additive flow therethrough.

4. The apparatus of claim 3, wherein the control valve is disposed within the housing.

5. The apparatus of claim 1, wherein the metering device is disposed within the housing.

6. The apparatus of claim 1, wherein the apparatus is disposed in a forward orientation so that the front port is coupled to a fuel vessel and at least one of the rear ports is coupled to an additive tank.

7. The apparatus of claim 6, wherein the fuel vessel is a fuel supply pipe.

8. The apparatus of claim 6, wherein the fuel vessel is a fuel tank.

9. The apparatus of claim 8, wherein the fuel tank is located on a truck at a truck loading terminal.

10. The apparatus of claim 1, wherein at least one of the plurality of valves is a solenoid valve.

11. An injection apparatus providing a plurality of additive flow paths between at least one upstream additive tank and at least one downstream fuel vessel, said apparatus comprising:
    a housing presenting a front port and at least two rear ports;
    a manifold disposed within the housing, the manifold having a first interface and a second interface;
    an additive conduit coupled with the first interface so that a first end of the additive conduit terminates at the manifold and a second end of the additive conduit is in fluid communication with the front port;
    a plurality of additive lines disposed within the housing and coupled with the second interface so that a first end of each additive line terminates at the manifold and a second end of each additive line is in fluid communication with a corresponding rear port, wherein the number of rear ports is equal to the number of additive lines coupled with the second interface;
    a plurality of valves, each disposed within one of the additive lines, wherein each of the valves is operable between an open position permitting additive flow therethrough and a closed position preventing additive flow therethrough; and
    a metering device coupled with the additive conduit for measuring the flow of additive therethrough.

12. An injection apparatus providing a plurality of additive flow paths between at least one upstream additive tank and at least one downstream fuel vessel, said apparatus comprising:
    a housing presenting a front port and at least two rear ports wherein the front port is adapted to be coupled to the fuel vessel and at least one of the rear ports is adapted to be coupled to the additive tank;
    a manifold disposed within the housing, the manifold having a first interface and a second interface;
    an additive conduit coupled with the first interface so that a first end of the additive conduit terminates at the manifold and a second end of the additive conduit is in fluid communication with the front port;
    a plurality of additive lines coupled with the second interface so that a first end of each additive line terminates at the manifold and a second end of each additive line is in fluid communication with a corresponding rear port;
    a plurality of valves disposed within the housing and coupled with the additive lines so that each valve is coupled to a corresponding additive line, wherein each of the valves is operable between an open position permitting additive flow therethrough and a closed position preventing additive flow therethrough;
    a metering device coupled with the additive conduit for measuring the flow of additive therethrough; and
    a circulation conduit intermediate the additive tank and the rear port.

13. The apparatus of claim 12, wherein a pump is coupled with the circulation conduit for pumping additive from the additive tank into the circulation conduit.

14. An injection apparatus providing a plurality of additive flow paths between at least one upstream additive tank and at least one downstream fuel vessel, said apparatus comprising:
- a housing presenting a front port and at least two rear ports, wherein the front port is adapted to be coupled to the additive tank and at least one of the rear ports is adapted to be coupled to the fuel vessel;
- a manifold disposed within the housing, the manifold having a first interface and a second interface;
- an additive conduit coupled with the first interface so that a first end of the additive conduit terminates at the manifold and a second end of the additive conduit is in fluid communication with the front port;
- a plurality of additive lines coupled with the second interface so that a first end of each additive line terminates at the manifold and a second end of each additive line is in fluid communication with a corresponding rear port;
- a plurality of valves disposed within the housing and coupled with the additive lines so that each valve is coupled to a corresponding additive line, wherein each of the valves is operable between an open position permitting additive flow therethrough and a closed position preventing additive flow therethrough; and
- a metering device coupled with the additive conduit for measuring the flow of additive therethrough.

15. The apparatus of claim 14, wherein the fuel vessel is a fuel supply pipe.

16. The apparatus of claim 14, wherein the fuel vessel is a fuel tank.

17. The apparatus of claim 16, wherein the fuel tank is located at a service station.

18. The apparatus of claim 14, further comprising a circulation conduit intermediate the additive tank and the front port.

19. The apparatus of claim 18, wherein a pump is coupled with the circulation conduit for pumping additive from the additive tank into the circulation conduit.

20. An injection apparatus providing a plurality of additive flow paths between at least one upstream additive tank and at least one downstream fuel tank, said apparatus comprising:
- a housing presenting a plurality of ports on the housing outer surface, wherein one or more front ports are located on a front surface and at least two rear ports are located on a rear surface;
- a manifold disposed within the housing, the manifold having first and second interfaces;
- one or more additive conduits coupled with the first interface so that a first end of each additive conduit terminates at the manifold and a second end of each additive conduit is in fluid communication with a corresponding front port;
- a plurality of additive lines coupled with the second interface so that a first end of each additive line terminates at the manifold and a second end of each additive line is in fluid communication with a corresponding rear port;
- a plurality of valves disposed within the housing and coupled with the additive lines so that each valve is coupled to a corresponding additive line, wherein each of the valves is operable between an open position permitting additive flow therethrough and a closed position preventing additive flow therethrough; and
- a metering device coupled with the additive conduit for measuring the flow of additive therethrough.

21. An injection apparatus providing a plurality of additive flow paths between at least one upstream additive tank and at least one downstream fuel vessel, said apparatus comprising:
- a housing presenting a front port and at least two rear ports;
- a manifold disposed within the housing, the manifold having a first interface and a second interface;
- an additive conduit coupled with the first interface so that a first end of the additive conduit terminates at the manifold and a second end of the additive conduit is in fluid communication with the front port;
- a plurality of additive lines coupled with the second interface so that a first end of each additive line terminates at the manifold and a second end of each additive line is in fluid communication with a corresponding rear port;
- a plurality of valves disposed within the housing and coupled with the additive lines so that each valve is coupled to a corresponding additive line, wherein each of the valves is operable between an open position permitting additive flow therethrough and a closed position preventing additive flow therethrough;
- a metering device coupled with the additive conduit for measuring the flow of additive therethrough; and
- an expansion port adapted for receiving an expansion apparatus presenting a number of additional additive flow paths.

* * * * *